(12) United States Patent
Pokaram Choudhary et al.

(10) Patent No.: US 12,384,242 B2
(45) Date of Patent: Aug. 12, 2025

(54) HANDLING DIFFERENTIALS IN A VEHICLE

(71) Applicant: VOLVO TRUCK CORPORATION, Gothenburg (SE)

(72) Inventors: Mukesh Pokaram Choudhary, Gothenburg (SE); Aditya Balkrishna Mapari, Gothenburg (SE); Christian Oscarsson, Stenungsund (SE); Robert Hjelte Ulmehag, Gothenburg (SE); Leo Laine, Gothenburg (SE); Bengt Jacobson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/977,531

(22) Filed: Dec. 11, 2024

(65) Prior Publication Data

US 2025/0196631 A1  Jun. 19, 2025

(30) Foreign Application Priority Data

Dec. 14, 2023 (EP) .................................. 23216646

(51) Int. Cl.
*B60K 23/08* (2006.01)
*B60W 10/12* (2012.01)
(Continued)

(52) U.S. Cl.
CPC .. *B60K 23/0808* (2013.01); *B60K 2023/0858* (2013.01); *B60W 10/12* (2013.01);
(Continued)

(58) Field of Classification Search
CPC ....... B60K 23/0808; B60K 2023/0858; B60W 10/12; B60W 30/0956; B60W 40/107; B60W 40/13; B60W 2530/10
See application file for complete search history.

(56) References Cited

U.S. PATENT DOCUMENTS 10,703,376 B2   7/2020  Coerman et al.
11,964,657 B2 * 4/2024  Song ............... B60W 30/18118
(Continued)

FOREIGN PATENT DOCUMENTS

DE    102017204354 B4 *  7/2023  ........... B60K 28/165
WO    2020160773 A1      8/2020

OTHER PUBLICATIONS

European Search Report dated Jun. 13, 2024 in corresponding European Patent Application No. 23216646.2, 9 pages.

*Primary Examiner* — Justin Holmes
(74) *Attorney, Agent, or Firm* — Venable LLP; Jeffri A. Kaminski

(57) ABSTRACT

A computer system (900) has processing circuitry to assist in handling a set of differentials of a vehicle. The processing circuitry determines a required longitudinal force for driving the vehicle in a driving direction. The processing circuitry predicts a first longitudinal force of the vehicle according to a current configuration, and to predict second longitudinal forces of the vehicle using differential locking configurations associated with locking or unlocking the set of differentials. The processing circuitry is configured to, when the first longitudinal force is below the required longitudinal force, select one of the differential locking configurations for the vehicle to use, which selected differential locking configuration is associated with a second longitudinal force equal to, or greater than, the required longitudinal force.

15 Claims, 8 Drawing Sheets

(51) Int. Cl.
*B60W 30/095* (2012.01)
*B60W 40/107* (2012.01)
*B60W 40/13* (2012.01)

(52) U.S. Cl.
CPC ....... *B60W 30/0956* (2013.01); *B60W 40/107* (2013.01); *B60W 40/13* (2013.01); *B60W 2530/10* (2013.01)

(56) References Cited

U.S. PATENT DOCUMENTS

2018/0281797 A1 10/2018 Berels et al.
2020/0164875 A1 5/2020 Öberg et al.
2023/0320249 A1* 10/2023 Vandike ............... A01B 79/005
                                                                701/50

* cited by examiner

HANDLING DIFFERENTIALS IN A VEHICLE

TECHNICAL FIELD

The disclosure relates generally to traction management of a vehicle. In particular aspects, the disclosure relates to handling a set of differentials in a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

To improve traction when one or more wheels of a vehicle is slipping, differentials may be locked such that the wheel speeds get synchronized between wheels and/or axles. This allows for improved traction of the vehicle as more power can be used on wheels with grip on a surface area. However, always locking differentials may lead to high tire wear and damage to driveline components. Locking differentials also affects lateral capabilities, such as handling and/or steering a vehicle in a curve. Hence, it is important to only lock differentials when needed.

A driver controls differential locking and unlocking, typically through a switch on dashboard. Locking and unlocking relies on the driver's experience and intuition and is thus heavily prone to human error. Locking and unlocking further has mechanical limitations which means there is a time delay to lock if wheels are already slipping.

There have been attempts to automate differential handling, for example by reactively locking a differential when a wheel slip of an associated wheel is detected. However, at this point, the wheel has already started slipping and gaining traction may take time and wasteful of resources.

An alternative way of improving traction could be to control a wheel slip by braking one of the spinning wheels or by reducing engine torque to the slipping wheel. This can however lead to high brake pad wear and energy loses.

Hence, there is a need to further improve traction of vehicles operating in areas with high risk of wheel slip occurring.

SUMMARY

According to a first aspect of the disclosure, a computer system comprising processing circuitry configured to assist in handling a set of differentials of a vehicle is provided. The set of differentials may be lockable differentials.

The processing circuitry is configured to obtain path information of a path travelled, or to be travelled, by the vehicle. The path information is indicative of a friction and/or a slope of a target area in a driving direction of the vehicle. The path information may additionally or alternatively further indicate a curvature, such as a radius of an upcoming curvature in the target area.

The processing circuitry is configured to obtain vehicle motion information of the vehicle. The vehicle motion information is indicative of a current vehicle speed of the vehicle.

The processing circuitry is configured to obtain a reference vehicle motion for the target area. The reference vehicle motion is indicative of a reference vehicle speed for the target area.

The processing circuitry is configured to, based on the vehicle motion information and the reference vehicle motion, predict an acceleration request the vehicle is to perform in the target area.

The processing circuitry is configured to, based on the vehicle motion information, the path information, and a mass of the vehicle, determine a required longitudinal force for driving the vehicle in the driving direction.

The processing circuitry is configured to, based on the acceleration request, the path information, and the mass of the vehicle, predict a first longitudinal force of the vehicle when the set of differentials is configured according to a current configuration.

The processing circuitry is further configured to, based on the acceleration request, the path information, and the mass of the vehicle, predict one or more second longitudinal forces of the vehicle using one or more differential locking configurations associated with locking or unlocking one or more differentials of the set of differentials.

The processing circuitry is configured to, when the first longitudinal force is below the required longitudinal force, select a differential locking configuration of the one or more differential locking configurations for the vehicle to use, which selected differential locking configuration is associated with a second longitudinal force equal to, or greater than, the required longitudinal force.

The first aspect of the disclosure may seek to automatically select and assess an appropriate differential locking configuration for driving the vehicle in the target area. A technical benefit may include improved traction and thereby enabling to drive in the target area. This is since the selected differential locking configuration is associated with a second longitudinal force equal to, or greater than, the required longitudinal force, thereby allowing the vehicle to be propelled in the target area without getting stuck with excessive wheel slip. Furthermore, excessive wear of prematurely locking differentials is reduced as the differentials will only be locked when predicted to be necessary.

Optionally in some examples, including in at least one preferred example the processing circuitry is configured to obtain at least part of the path information by sensing the path information using one or more sensors of the vehicle.

A technical benefit may include improved accuracy of predicting the associated longitudinal forces depending on the path information, and thereby leading to improved selection of the most appropriate differential locking configuration.

Optionally in some examples, including in at least one preferred example, the processing circuitry is configured to obtain at least part of the path information by obtaining the path information from a storage medium and/or a server.

A technical benefit may include improved accuracy of predicting the associated longitudinal forces depending on the path information, and thereby leading to improved selection of the most appropriate differential locking configuration.

Optionally in some examples, including in at least one preferred example, the path information is at least partly based on measurements of one or more measuring vehicles which have previously travelled the target area.

A technical benefit may include improved accuracy of predicting the associated longitudinal forces depending on the path information, and thereby leading to improved selection of the most appropriate differential locking configuration.

Optionally in some examples, including in at least one preferred example the processing circuitry is configured to predict the acceleration request of the vehicle in the target area, based on the path information, and based on a predefined driver model indicative of timing and/or magnitude of the acceleration request.

A technical benefit may include improved accuracy of predicting the associated longitudinal forces depending on the acceleration request, and thereby leading to improved selection of the most appropriate differential locking configuration.

Optionally in some examples, including in at least one preferred example, any one or more out of the required longitudinal force, the first longitudinal force, and/or the one or more second longitudinal forces, are limited based on force generating capabilities of a powertrain of the vehicle.

A technical benefit may include improved selection of the most appropriate differential locking configuration. This is since the associated longitudinal forces are not over-estimated, and further, it makes it possible to check the possibility of meeting the longitudinal forces with the current on force generating capabilities of the powertrain.

Optionally in some examples, including in at least one preferred example, the processing circuitry is configured to, based on the path information, predict one or more vertical loads applied to one or more axles and/or one or more wheels of the vehicle. In these examples, the processing circuitry is further configured to predict the first longitudinal force and/or the one or more second longitudinal forces based on the predicted vertical loads.

A technical benefit may include improved selection of the most appropriate differential locking configuration. This is since the first longitudinal force and/or the one or more second longitudinal forces may be more accurately predicted.

Optionally in some examples, including in at least one preferred example, the one or more differential locking configurations comprise locking an inter-wheel differential of the set of differentials. Additionally or alternatively, the one or more differential locking configurations comprise locking an inter-axle differential of the set of differentials.

A technical benefit improved selection of the most appropriate differential locking configuration, this is since more options are available to select from, to meet the required longitudinal force.

Optionally in some examples, including in at least one preferred example, the processing circuitry is configured to apply the selected differential locking configuration prior to reaching the target area.

A technical benefit may include improved traction and enabling to drive the vehicle in the target area.

Optionally in some examples, including in at least one preferred example, the processing circuitry is configured to determine steering capabilities of the vehicle when using the selected differential locking configuration in the target area. In these examples, the processing circuitry is configured to, based on the path information and the steering capabilities, estimate a steering compensation required to maintain a vehicle trajectory and/or to maintain the vehicle within boundaries of the target area. The boundaries of the target area may be geographical boundaries and/or boundaries of size of a road or drive area in the target area. In these examples, the processing circuitry is configured to, determine whether or not to apply the selected differential locking configuration prior to reaching the target area based on the estimated required steering compensation.

A technical benefit may include improved safety in response to selecting a differential locking configuration not possible to use for driving in the target area. The driver may select another configuration or a new prediction for another differential locking configuration may be initiated to improve traction in the target area.

According to a second aspect of the disclosure, a vehicle comprising a set of differentials is provided. The vehicle comprises the computer system according to the first aspect.

Optionally in some examples, including in at least one preferred example, the set of differentials comprise at least one inter-wheel differential, or a combination of at least one inter-axle differential and at least two inter-wheel differentials.

According to a third aspect of the disclosure, a computer-implemented method for assisting in handling a set of differentials of a vehicle is provided.

The method comprises: by processing circuitry of a computer system, obtaining path information of a path travelled, or to be travelled, by the vehicle. The path information is indicative of a friction and/or a slope of a target area in a driving direction of the vehicle. The path information may additionally or alternatively further indicate a curvature, such as a radius of an upcoming curvature in the target area.

The method comprises: by the processing circuitry, obtaining vehicle motion information of the vehicle. The vehicle motion information is indicative of a current vehicle speed of the vehicle.

The method comprises: by the processing circuitry, obtaining a reference vehicle motion for the target area. The reference vehicle motion is indicative of a reference vehicle speed for the target area.

The method comprises: by the processing circuitry, based on the vehicle motion information and the reference vehicle motion, predict an acceleration request the vehicle is to perform in the target area.

The method comprises: by the processing circuitry, based on the vehicle motion information, the path information, and a mass of the vehicle, determining a required longitudinal force for driving the vehicle in the driving direction.

The method comprises: by the processing circuitry, based on the acceleration request, the path information, and the mass of the vehicle, predicting a first longitudinal force of the vehicle when the set of differentials is configured according to a current configuration.

The method comprises: predicting one or more second longitudinal forces of the vehicle using one or more differential locking configurations associated with locking or unlocking one or more differentials of the set of differentials.

The method comprises: by the processing circuitry, when the first longitudinal force does not meet the required longitudinal force, selecting a differential locking configuration of the one or more differential locking configurations for the vehicle to use, which selected differential locking configuration is associated with a second longitudinal force equal to, or greater than, the required longitudinal force.

Optionally in some examples, including in at least one preferred example, the method comprises, by the processing circuitry, based on the path information, predicting one or more vertical loads applied to one or more axles and/or one or more wheels of the vehicle, and by the processing circuitry, predicting the first longitudinal force and/or the one or more second longitudinal forces based on the predicted vertical loads.

Optionally in some examples, including in at least one preferred example, the method comprises, by the processing circuitry, determining steering capabilities of the vehicle when using the selected differential locking configuration in the target area, and by the processing circuitry, based on the path information and the steering capabilities, estimating a steering compensation required to maintain a vehicle trajectory and/or to maintain the vehicle within boundaries of the target area, and by the processing circuitry, determining whether or not to apply the selected differential locking configuration prior to reaching the target area based on the estimated required steering compensation.

Optionally in some examples, including in at least one preferred example, the method comprises, by the processing circuitry, applying the selected differential locking configuration prior to reaching the target area.

Optionally in some examples, including in at least one preferred example, the one or more differential locking configurations comprise locking an inter-wheel differential of the set of differentials, and/or wherein the one or more differential locking configurations comprise locking an inter-axle differential of the set of differentials.

Optionally in some examples, including in at least one preferred example, the method comprises, the path information is at least partly based on measurements of one or more measuring vehicles which have previously travelled the target area.

Technical benefits of the second aspect and/or the third aspect corresponds to the technical benefits of the first aspect and vice versa.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

Relying on drivers to lock differentials is likely to lead to errors which thereby induces excessive wear on components, as well as risks using wrong locking configurations which can lead to the vehicle getting stuck in place if the friction is too low to lock differentials when already experiencing a wheel slip. Similar problems arise when relying on reactive systems to lock differentials when wheels are already slipping and spinning.

Hence, examples herein may relate to predicting how a vehicle will behave with different differential locking configurations, and selecting the configuration which is predicted to let the vehicle drive in a target area.

Figure 1:
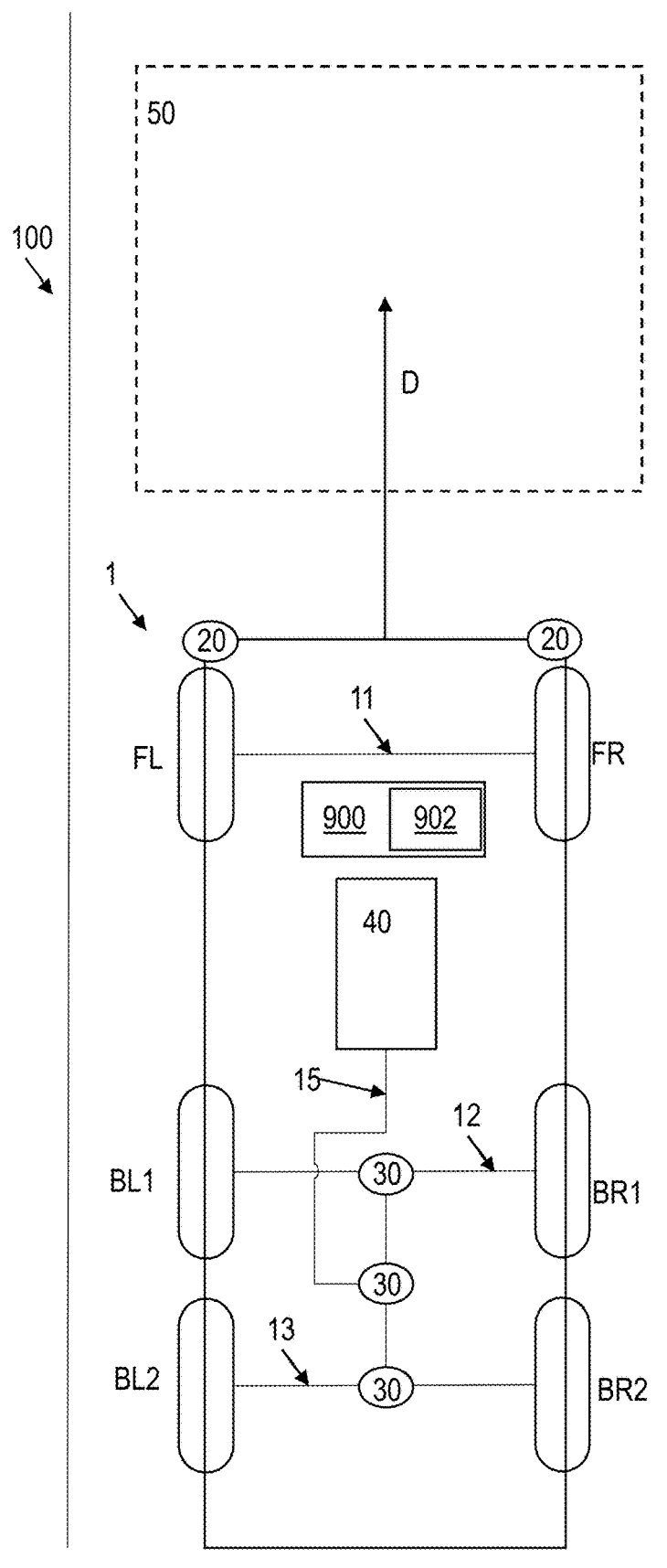
FIG. 1 illustrates an example path and vehicle according to an example.

FIG. 1 illustrates a vehicle 1 and a path 100 according to an example. The path 100 may typically be a road, but can also be any offroad path where the vehicle 1 is arranged to travel.

The vehicle 1 is arranged to travel the path 100, i.e., to travel in a driving direction D, towards a target area 50.

For examples herein, the target area 50 may comprises a surface area which have low friction, e.g., lower than a threshold, or has one or more slopes, increasing in the target area 50 by more than a set angle.

The target area 50 may have a split surface such that the friction will be different for the right side and the left side of the vehicle 1.

The vehicle 1 may be any suitable vehicle, e.g., a car, a bus, a truck, or any other vehicle heavy duty vehicle.

The vehicle 1 may have two or more axles, in any suitable configuration.

The vehicle 1 in FIG. 1, illustrates a scenario when the vehicle 1 has three axles, e.g., a first axle 11, a second axle 12, and a third axle 13, connected to associated wheels, e.g., a front left wheel FL, a front right wheel FR, a first rear left wheel BL1, a first rear right wheel BR1, a second rear left wheel BL2, and a second rear right wheel BR2.

The second and third axles 12, 13 may be driven axles, e.g., driven by a powertrain 40 using a driveline 15 to transfer torque from the powertrain 40 to the second and third axles 12, 13.

The vehicle 1 comprises a set of differentials 30 which may be used for locking wheels and/or axles of the vehicle 1 such that they synchronize in speed and provide better traction when locked. As a non-limiting example as illustrated in FIG. 1, the set of differentials may be coupled with the second and third axles 12, 13 and the driveline 15 such that an inter-axle differential may lock the second and third axles 12, 13 such that they are provided with the same rotational speed from the driveline 15. In other words, inter-axle as used herein may mean that two or more axles are locked to have the same rotational speed, i.e., get the same rotation from the driveline 15. Furthermore, an inter-wheel differential may lock the wheels of the second axle 12, and another inter wheel differential may lock the wheels of the third axle 13.

In examples herein, the term differential, may mean a differential with a locking device or a lockable differential, e.g., a differential associated with a clutch or coupling for locking said differential.

As an example, the set of differentials 30 may comprise at least one inter-wheel differential, or a combination of at least one inter-axle differential and at least two inter-wheel differentials.

The set of differentials 30 may be locked according to one or more locking configurations as discussed in examples herein.

The locking of the set of differentials 30 may be naturally ordered, i.e., by first locking an inter-axle differentials (if applicable) and then locking one or more inter-wheel differentials.

The locking of set of differentials 30 may further naturally be ordered in increased amount of longitudinal force, e.g., further based on a vehicle motion and mass. All unlocked, e.g., the current configuration may result in the first longitudinal force, locking different combinations of the set of differentials 30 may increase the longitudinal force such as in the one or more differential locking configurations resulting in the one or more second longitudinal forces, which may all be equal to or greater than the first longitudinal force.

The first longitudinal force may be a force acting on the vehicle 1, e.g., in the driving direction D.

The vehicle 1 is typically driven by a user, but may also be autonomous or at least partly autonomous, i.e., at least part of driving operations being automated.

The vehicle 1 may comprise one or more sensors 20. The one or more sensors 20 may comprise any suitable sensors for measuring path information of the path 100 or information used to derive path information or any other suitable information for examples herein, e.g., any one or more out of slope, friction, surface type, weather, environmental information, and/or shape.

The one or more sensors 20 may comprise any one or more out of:
One or more cameras, and
One or more Light Detection and Ranging (Lidar) sensors.

Examples herein may be performed by a computer system 900 and/or by a processing circuitry 902 therein.

The computer system 900 and/or the processing circuitry 902 therein may be a processor and/or an Electronic Control Unit (ECU).

The computer system 900 and/or the processing circuitry 902 therein may be one or more remote units e.g., as part of a cloud service in a server, and/or comprised in the vehicle 1.

The computer system 900 and/or the processing circuitry 902 therein may be communicatively coupled with, and/or able to control, any suitable unit and/or entity of the vehicle 1.

Examples herein may relate to predicting a required longitudinal force to propel the vehicle 1 in the driving direction in the target area 50, and furthermore, also the longitudinal forces related to locking different differentials in the set of differentials 30, and further use these forces as a basis for selecting the best locking configuration that will ensure traction for the vehicle 1.

Examples herein may comprise two stages, a prediction stage and decision stage.

The prediction stage may comprise usage of upcoming road profile and/or surface data of the surface area 50, also referred to as path information in examples below. Over a prediction horizon, e.g., 5-15 seconds or 25-75 meters, the required longitudinal force may be calculated, e.g., taking into account changes in vertical load on each wheel and maximum traction capability, i.e., longitudinal force acting on the vehicle 1, with differential lock and unlock condition.

The decision stage may take input from the prediction stage, e.g., preferred differential setting to maximize traction and may take the required action i.e., apply the appropriate configuration. An applying action may comprise locking/unlocking interaxle differentials, inter wheel differentials, using existing traction control function or using vehicle's inertia i.e., no action. The decision stage may further include steering capabilities to decide whether or not to lock differentials.

Thus, using predictions, the set of differentials 30 may be engaged, i.e., locked, long before the vehicle 1 reaches the target area 50. This reduces dependency on drivers and is faster to react, more wear-friendly, and more energy efficient than reactive systems which locks differentials when detecting a slip. Using predictions, i.e., such that the set of differentials 30 may be locked prior to wheel slips may also reduce a risk of the vehicle 1 getting stuck in a low friction area.

If a decision is to lock an inter wheel differential for a straight road due to a split friction surface detection, i.e., the target area 50 may only be slippery on one side, the prediction stage may further calculate a yaw torque on the vehicle 1 due to differential lock and may further predict a required steering wheel angle correction to be able to drive in the target area 50.

Figure 2:
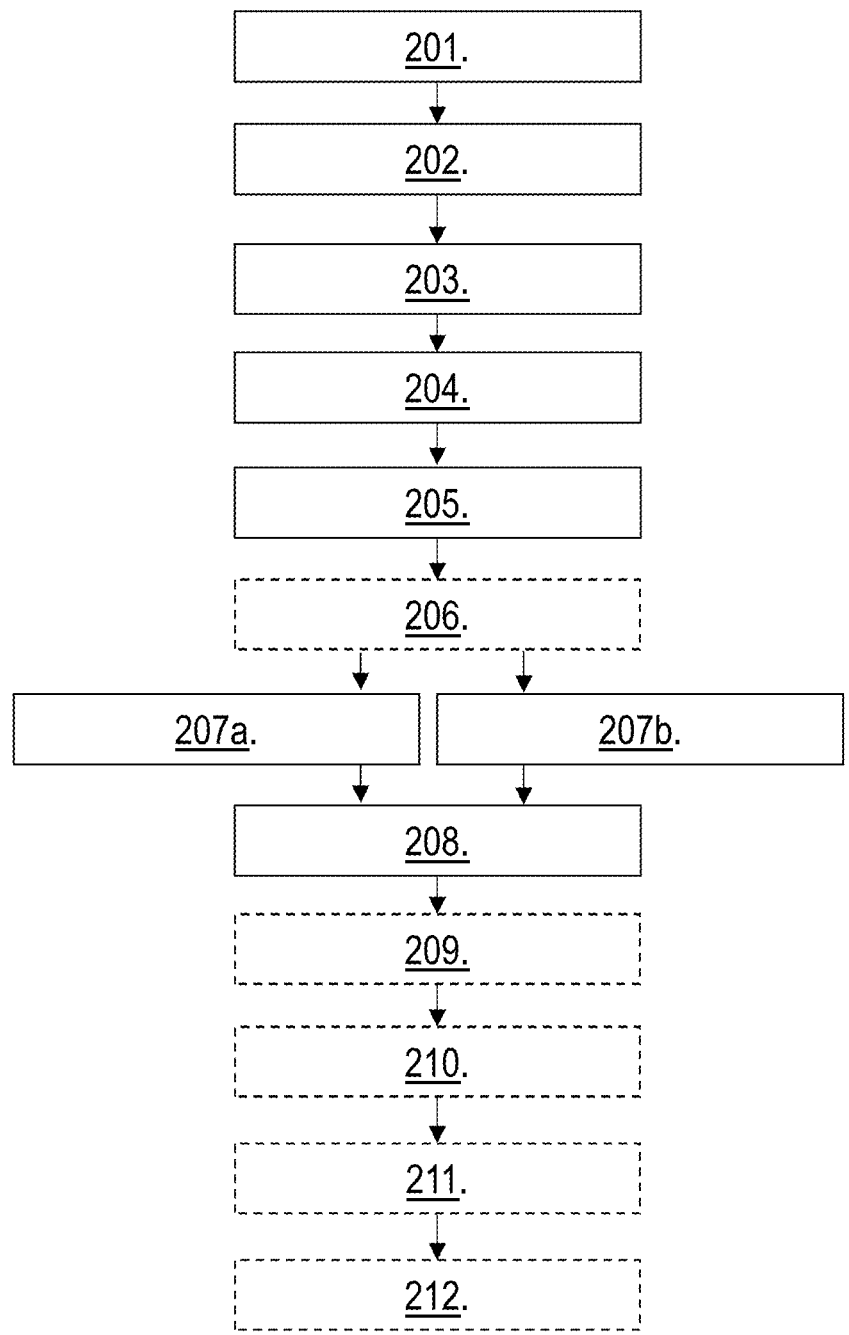
FIG. 2 is a flow chart of a method to according to an example.

FIG. 2 is a flow chart of a method for assisting in handling a set of differentials 30 of a vehicle 1. Assisting as used herein may mean to directly or indirectly select or otherwise provide a differential locking configuration for the set of differentials 30. In below examples, the set of differentials 30 comprises at least one inter-wheel differential, or a combination of at least one inter-axle differential and at least two inter-wheel differentials. The method comprises the following actions, some of which may be performed concurrently. The following actions may be performed in any suitable order. Optional actions are indicated by dashed boxed in FIG. 2. The below actions may be performed by the computer system 900 and/or the processing circuitry 902 therein. The below actions may be iterated any number of times, e.g., as long as the vehicle 1 is travelling.

Action 201

The method comprises obtaining path information of the path 100 travelled, or to be travelled, by the vehicle 1. The path information is indicative of a friction and/or a slope of a target area 50 in the driving direction D of the vehicle 1.

The path 100 may typically be a road but can also be a predetermined offroad path.

The path information may comprise any suitable static or predefined road information which such as any one or more out of:
slope information, e.g., angle of the slope,
boundary information, e.g., boundaries of the road/path such as size, width, etc.,
curvature information, e.g., how the road/path is curved,
profile of the road/path, e.g., detailed information of the path structure such as slope, bumps, curves, etc.
type of the road/path,
friction information, e.g., estimated friction coefficient of the road/path, and
environmental information, e.g., affecting a friction of the road/path.

In some examples, the path information is at least partly based on measurements of one or more measuring vehicles, which have previously travelled the target area 50. The one or more measuring vehicles may or may not comprise the vehicle 1.

In some examples, obtaining the path information or at least part of the path information comprises sensing the path information using the one or more sensors 20 of the vehicle 1, e.g., using any one or more out:
One or more cameras,
One or more Global Positioning System (GPS) sensors, and
One or more Lidar sensors.

Sensing the path information may comprise sensing environmental information of the path 100, or other information indicative of a friction of the target area 50, e.g., information of if it is raining or snowing, and/or if the path 100 and the target area 50 is slippery, e.g., is associated with icy conditions.

In some examples, obtaining the path information or at least part of the path information comprises obtaining the path information from a storage medium and/or a server, i.e., at least part of the path information may be predefined, e.g., such as map information, e.g., slope angles, surfaces types, curvatures etc.

Action 202

The method comprises obtaining vehicle motion information of the vehicle 1.

The vehicle motion information is indicative of a current vehicle speed of the vehicle 1.

The vehicle motion information may further be indicative of any suitable parameter indicative of the motion and/or forces of the vehicle 1, e.g., that can be applied or maintained by the vehicle 1, e.g., such any one or more out of: pitch, acceleration, yaw, steering wheel angle, wheel angles, a current differential status or configuration, a currently applied torque to wheels of the vehicle 1, and a currently provided longitudinal force.

In other words, the vehicle motion information may be any suitable information which describes a current motion of the vehicle 1.

Action 203

The method comprises obtaining a reference vehicle motion for the target area 50.

The reference vehicle motion being indicative of a reference vehicle speed for the target area 50.

The reference vehicle motion may further be indicative of any suitable parameter for assessing the motion and/or forces that can be applied or maintained by the vehicle 1, e.g., any one or more out of: pitch, acceleration, yaw, steering wheel angle, wheel angles, a current differential status or configuration, and a currently provided longitudinal force. In some examples, the reference vehicle motion may only need to comprise a reference velocity, steering wheel angle, or target global forces.

In other words, the reference vehicle motion may be any suitable information which describes a target vehicle motion in the target area 50.

The reference vehicle motion may be specified in one or more locations of the target area 50, such as a certain movement or speed in a respective location.

The reference vehicle motion may be a recording of a one or more reference vehicles, e.g., the vehicle 1 and/or another vehicle and/or a simulated vehicle, travelling the path 100.

Action 204

The method comprises predicting an acceleration request the vehicle 1 is to perform in the target area 50. Performing the request as used herein may mean that the vehicle 1 issues or transmits an instruction for the request. The acceleration request is predicted based on the vehicle motion information and the reference vehicle motion. For example, the current speed is established by the vehicle motion information, and a target speed is established by the reference vehicle motion, e.g., at a set location in the target area 50, and thereby, to achieve the reference vehicle motion, it can be predicted where, when, and magnitude of the acceleration request.

Predicting the acceleration request of the vehicle 1 in the target area 50 may be based on the path information and based on a predefined driver model indicative of timing and/or magnitude of the acceleration request.

The predefined driver model may be a speed controller and/or path follower that predicts a longitudinal acceleration in the target area.

Additionally or alternatively, the predefined driver model may be a machine learning model, trained based on input from the driver, e.g., when previously driving in the path 100 and the target area 50. Additionally, or alternatively, the predefined driver model may have been trained on one or more other drivers which have driven the path 100 and the target area 50. Additionally or alternatively, the predefined driver model may use an extrapolation technique or optimization to predict a longitudinal acceleration based on a current input and based on historical data.

In other words, the predefined driver model may be a simple speed model and/or may be a model which is trained to predict where the acceleration request will occur and by how much. The model may be tailored to a specific driver or generalized for all drivers.

For example the predefined driver model may be used to predict how/when a driver of the vehicle 1 will perform the acceleration request, e.g., based on any one or more out of, the reference vehicle motion, the vehicle motion information, and the path information.

In examples herein, predicting the acceleration request may further obtain and use information of the steering wheel angle of the vehicle 1.

Action 205

The method comprises determining a required longitudinal force for driving the vehicle 1 in the driving direction D.

Determining the required longitudinal force is based on the vehicle motion information, the path information, and a mass of the vehicle 1.

The mass of the vehicle may or may nor include a current payload of the vehicle 1. If the payload is not known, a maximum payload of the vehicle may be used. The mass may be predefined or may be estimated using any suitable estimation method.

The required longitudinal force may be a force needed to drive the vehicle 1 in the driving direction D, such as forward, when in the target area 50. In some examples, the required longitudinal force may be a force needed to attain the reference vehicle motion.

The required longitudinal force may determined such as calculated based on the acceleration request and the mass, e.g., multiplied. Additionally, any one or more out of the following may be accounted for:

- a rolling resistance force, e.g., as based on friction information as part of the path information,
- a slope resistance force, e.g., as based on slope information as part of the path information, and
- aerodynamics, e.g., as determined based on a predefined model of the vehicle 1, its speed, and/or based on the current and/or reference vehicle motion.

The required longitudinal force may be limited based on force generating capabilities of a powertrain 40 of the vehicle 1. This means that determining the required longitudinal force may be based on the force generating capabilities of a powertrain 40 of the vehicle 1.

Action 206

In some examples the method comprises, predicting one or more vertical loads applied to one or more axles and/or one or more wheels of the vehicle 1.

The prediction may be based on the path information, e.g., indicative of any one or more out of bumps, slopes and/or potholes.

Action 207a

The method comprises predicting a first longitudinal force of the vehicle 1 when the set of differentials 30 is configured according to a current configuration. Typically, the set of differentials 30 may initially be all unlocked.

The prediction of the first longitudinal force is based on the acceleration request, e.g., when and by how much the vehicle 1 is to request acceleration, the path information, e.g., friction and/or slope in the path 100, and the mass of the vehicle 1, e.g., how much weight is needed to be moved in the driving direction D when the acceleration is requested. In other words, the prediction of the first longitudinal force may be based on how much more acceleration is required to attain a reference speed based on the mass of the vehicle 1. The mass of the vehicle 1 may include any payload carried by the vehicle 1.

The first longitudinal force may be limited based on force generating capabilities of a powertrain 40 of the vehicle 1. This means that predicting the first longitudinal force may further be based on the force generating capabilities of a powertrain 40 of the vehicle 1.

Predicting the first longitudinal force may further be based on the predicted vertical loads, i.e., there may be a model and/or predefined correspondence between the predicted vertical loads and corresponding longitudinal force(s). Path information and expected acceleration of the vehicle 1 may be used to calculate vertical load change on each wheel and axle. Along with friction this may be used to predict the first longitudinal force.

In other words, the first longitudinal force may be a force acting on the vehicle 1, e.g., in the driving direction D. The first longitudinal force may be a force acted on the vehicle 1 based on a motion of the vehicle 1, mass of the vehicle 1, an acceleration request, path information such as friction, and based on the current configuration of the set of differentials 30, e.g., all being unlocked, e.g., as predicted as part of action 207a.

Action 207b

The method comprises predicting one or more second longitudinal forces of the vehicle 1 using one or more differential locking configurations associated with locking or unlocking one or more differentials of the set of differentials 30.

The prediction of the one or more second longitudinal forces is based on the acceleration request, e.g., when and by how much the vehicle 1 is to request acceleration, the path information, e.g., friction and/or slope in the path 100, and the mass of the vehicle 1, e.g., how much weight is needed to be moved in the driving direction D when the acceleration is requested, or how much more acceleration is needed to move the vehicle 1 with the mass on the vehicle 1 in the direction D The difference from predicting the first and the one or more second longitudinal forces is the state of the set of differentials, i.e., which are locked or unlocked, which may provide different wheel speeds, may avoid slippage or wheel spinning, and may improve traction and thereby may achieve different longitudinal forces, such as increased longitudinal forces than the first longitudinal force.

In essence, locking differentials most often improve traction, and locking multiple differentials, even more so, e.g., which may be evaluated as part of the predictions herein, but may also induce wear and/or may take time. In other words, unless it is needed to lock a differential, it is preferred not to lock the differential.

Typically, since the set of differentials 30 may initially be all unlocked, the one or more differential locking configurations may be associated with locking one or more differentials in the set of differentials 30.

The one or more differential locking configurations may be exhaustive, i.e., may comprise all locking configurations different from the current locking configuration. Alternatively, the one or more differential locking configurations may comprise only one or a selected number of configurations.

The one or more second longitudinal force may be limited based on force generating capabilities of a powertrain 40 of the vehicle 1. This means that predicting the one or more second longitudinal force may further be based on the force generating capabilities of a powertrain 40 of the vehicle 1.

Predicting the one or more second longitudinal forces may further be based on the predicted vertical loads, i.e., there may be a model and/or predefined correspondence between the predicted vertical loads and corresponding longitudinal force(s).

Predicting the first longitudinal force and/or the one or more second longitudinal forces may further be based on any suitable machine learning model, e.g., as part of any machine learning model of examples herein, trained to predict the respective longitudinal forces based on any number of suitable training parameters, e.g., as may be obtained in previous travels in the target area 50 and/or in other similar areas by the vehicle 1 and/or other training vehicles, such as any one or more out of: respective target area(s), respective acceleration request(s), respective path information(s), e.g., respective friction and/or respective slope, and respective mass of the respective vehicle, and/or respective vertical loads to be applied in the respective target area(s).

In other words, the one or more second longitudinal forces may be a force acting on the vehicle 1, e.g., in the driving direction D. The one or more second longitudinal forces may respectively be forces acted on the vehicle 1 based on a motion of the vehicle 1, mass of the vehicle 1, an acceleration request, path information such as friction, and based on the different candidate locking configurations of the set of differentials 30, e.g., different configurations of locking differentials, e.g., as predicted as part of action 207b.

Action 208

The method comprises selecting a differential locking configuration of the one or more differential locking configurations for the vehicle 1 to use, when the first longitudinal force does not meet the required longitudinal force.

The first longitudinal force not meeting the required longitudinal force, may mean that the first longitudinal force is below the required longitudinal force.

The selected differential locking configuration is associated with a second longitudinal force equal to, or greater than, the required longitudinal force.

Selecting the differential locking configuration may comprises checking the one or more differential locking configurations in an order, e.g., first inter-axle then inter-wheel, if a respective configuration, e.g., locking an inter-axle differential, would lead to enough traction such as that the respective second longitudinal force of the respective configuration is at least equal to the required longitudinal force, possibly accounting for an error margin, and if so, the respective locking configuration is selected, and otherwise, the next configuration is checked, e.g., locking both inter-axle and inter-wheel differentials, in the same corresponding manner.

If it is indicated by the first longitudinal force and/or the one or more second longitudinal forces that unlocking one or more differentials of the set of differentials 30 as part of a locking configuration would lead to meeting the required longitudinal force, such a locking configuration is to be prioritized to be selected.

Action 209

In some examples the method comprises determining steering capabilities of the vehicle 1 when using the selected differential locking configuration in the target area 50.

The steering capabilities may relate to how much yaw and/or lateral force the vehicle 1 may achieve when steering in a direction using the selected differential locking configuration.

The steering capabilities may be determined in relation to the path information, e.g., the friction, slope, and/or curvature.

In other words, maximum steering capabilities, e.g., lateral forces that can be applied on a front axle, e.g., the first axle 11, while the vehicle 1 is following an intended curve, may be calculated based on predicted vertical loads on the front axle and friction information of the path 100.

Action 210

In some examples the method comprises, estimating a steering compensation required to maintain a vehicle trajectory and/or to maintain the vehicle 1 within boundaries of the target area 50, i.e., geographical boundaries or a boundary of a width of a road or travel area of the path. Estimating the steering compensation may be based on the steering capabilities and the path information, e.g., indicative of friction and/or slope of the target area 50 and/or the boundaries, i.e., a width of the target area 50.

The steering compensation may be indicative of how much the vehicle 1 will have to steer to not drive off the road in the target area 50.

As an example, only one side of the vehicle 1 may have slippery road surface in the target area 50, and to maintain driving straight, the vehicle 1 will have to steer hard to the other side.

The estimation as used herein may further be used to balance lateral and traction capabilities.

A yaw torque of the vehicle 1 may be generated when the inter-wheel differentials are locked and the vehicle 1 encounters difference in friction level on the left and right side of the vehicle 1. The yaw torque may be generated due to uneven longitudinal forces generated on the left and right side of the vehicle 1. To compensate for this yaw torque and to make the vehicle 1 drive on the desired path, e.g., in the target area 50, the steering compensation may be required.

In other words, if differentials are supposed to be locked, an additional steering wheel angle required to compensate with locked diff may be calculated. The compensation may be compared with a maximum predicted lateral force. If it is not possible to compensate the additional steering wheel angle due to locked differential, the differentials are not locked. This may be performed in the decision stage as discussed above and below.

Action 211

In some examples the method comprises, determining whether or not to apply the selected differential locking configuration prior to reaching the target area 50 based on the estimated or predicted required steering compensation.

For example, if the steering compensation is above a threshold, it may not be safe to proceed, and thereby it may be determined to not apply the selected differential locking configuration prior to reaching the target area 50.

As another example, the steering compensation may not be possible to perform by the vehicle 1, i.e., the steering compensation needed may be too high for the vehicle 1. When the steering compensation needed is too high for the vehicle 1, the steering compensation needed may exceed a steering compensation threshold.

Action 212

In some examples the method comprises applying the selected differential locking configuration prior to reaching the target area 50, e.g., at least 5-50 meters, depending on speed, before reaching the target area 50 such that the differentials is properly locked when entering the target area 50.

In this way, wheel slip is mitigated in the target area 50, traction improved, without excessive wear to the vehicle 1.

Furthermore, due to mechanical limitations of locking differentials, applying the correct differential locking ahead of time will save time and resourced compared to if needed to lock the differentials when starting to slip.

When exiting the target area 50, the initial differential locking configuration may be reset and/or it may be predicted which differential locking configuration is suitable for a second area beyond the target area 50 with respect to longitudinal force, and subsequently, said differential locking configuration may be set when exiting the target area 50 and when entering, or prior to entering, the second area.

In some examples herein there may be a time delay between a differential lock request, i.e., when applying the selected differential locking configuration, and an actual change of the differential locking configuration due to mechanical limitations. Such timing differences may be accounted for in examples herein, e.g., as in how early ahead of the target area 50 the configuration shall apply.

To further assist in applying the selected differential locking, additional functions such as wheel speed and/or axle speed synchronization functions may be added to immediately lock differentials when requested. I.e., the wheel and/or axles may first be synchronized by other means such as braking the wheels and/or axles to synchronize their speed such that differential locking may take place quicker.

Figure 3A:
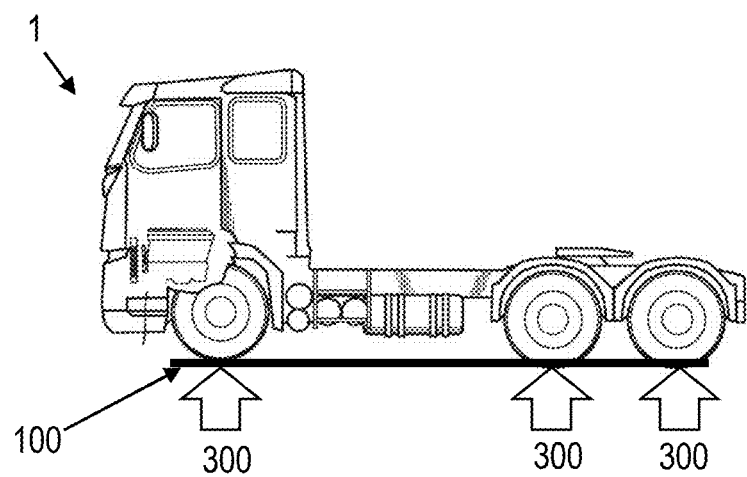
FIGS. 3a-3b illustrates example scenarios according examples herein
Figure 3B:
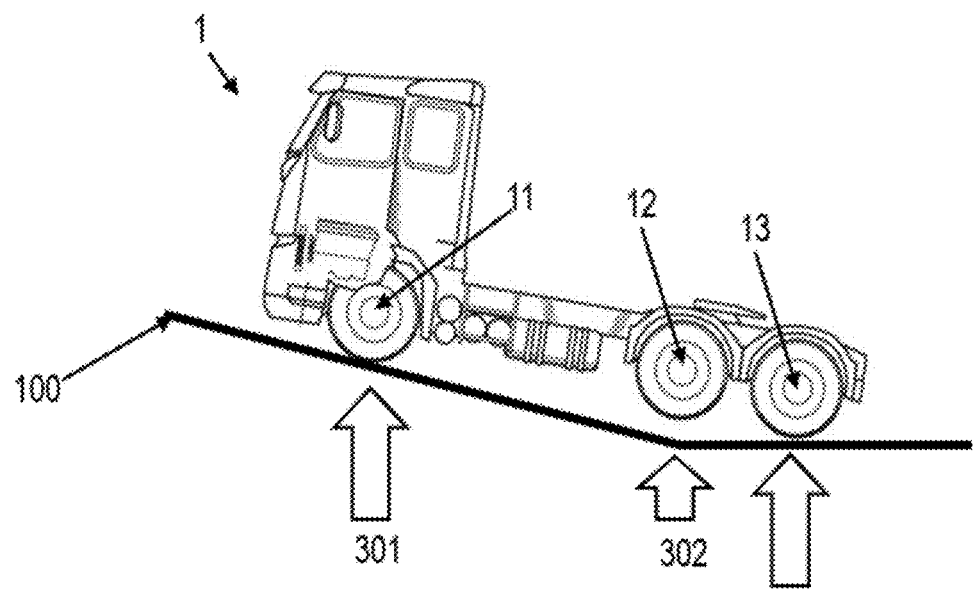

FIGS. 3a-3b illustrates example scenarios according to examples herein.

FIG. 3a first illustrates the vehicle 1 on a level road with even vertical forces 300 applied to the axles of the vehicle 1. In these situations, in case the friction of the surface area of the path 100 is sufficient to propel the vehicle 1, there is no need to lock the set of differentials 30.

FIG. 3b, illustrates an uphill gradient, e.g., as part of the target area 50, where a first driven axle, e.g., the second axle 12, of the vehicle 1 has reduced vertical load 302 as compared to high vertical load 301 on the first axle 11 and the third axle 13. A too high vertical load 301 may be a load exceeding a load threshold. Such steep uphill with low friction surface such as snow, mud or gravel can be seen on construction sites, mining sites or forest roads. In these situations, an inter-axle differential of the set of differentials 30 may need to be locked, preferably in advance of entering the slope, such that more power is transmitted to wheels of the third axle 13.

Figure 4:
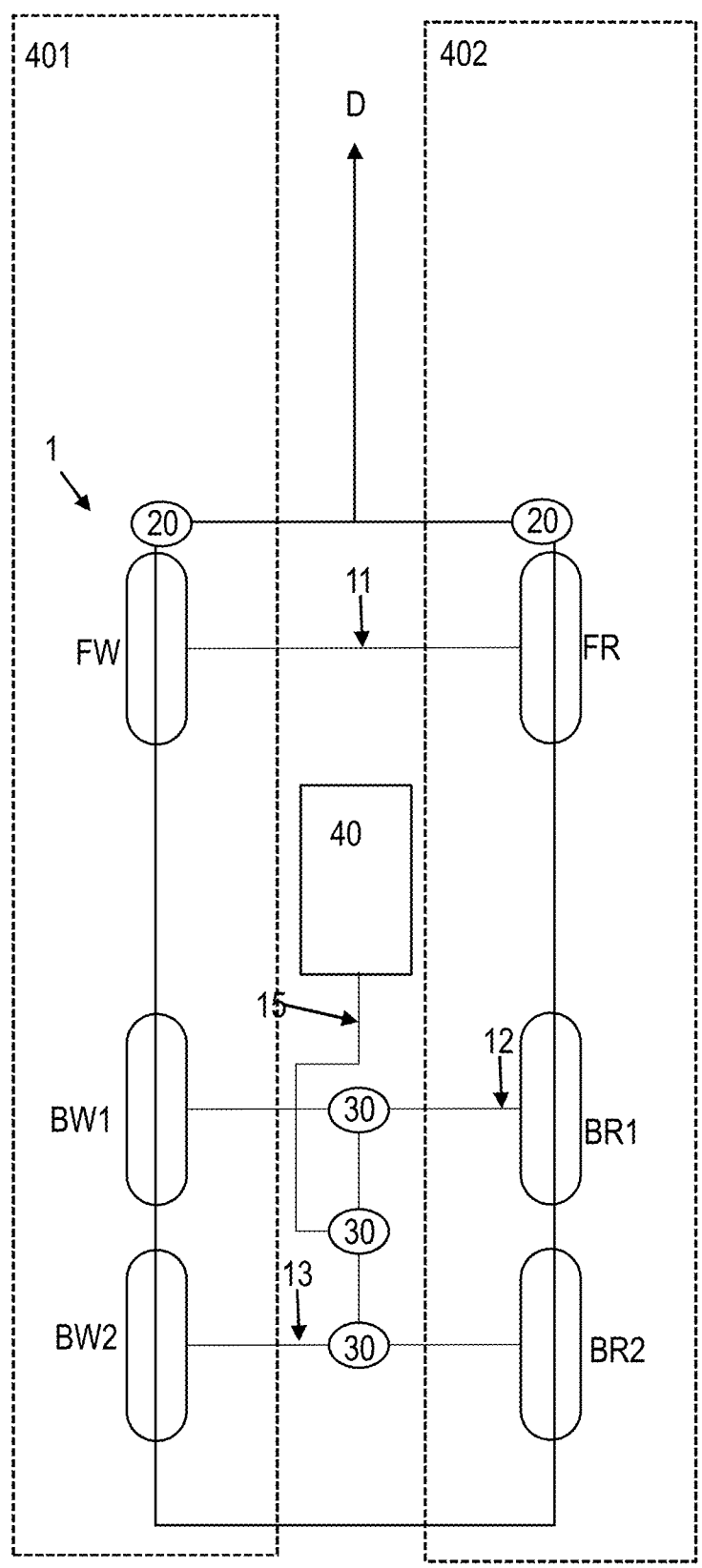
FIG. 4 illustrates an example scenario according examples herein.

FIG. 4 illustrates an example scenario according examples herein. FIG. 4 illustrates an example of a split friction road condition i.e., the friction under left and right wheels may be different due to different friction on a left surface area 401, and a right surface area 402, e.g., as part of the target area 50.

Each wheel's maximum traction capability may be limited by either maximum engine power, i.e., powertrain 15 capability, or road-wheel interaction capability, which may mean friction times vertical load.

In this scenario, the left surface area 401 may have high friction i.e., a road-wheel interaction capability above a threshold and higher than the right surface area 402.

This means that the left wheels will experience different spin and slippage, and when the vehicle 1 attempts to travel in the driving direction D, the vehicle 1 may due to the differing slippage of right and left wheels, get applied a yaw moment such that the vehicle is turning towards the lower friction side. To improve traction and to better handle the vehicle, differentials such as inter-axle differentials may need to be locked, preferably in advance of entering the surface areas 401, 402.

In other words, in these road conditions, the road-wheel interaction capability may decrease either due to reduced vertical load, e.g., road profile, or due to low friction e.g., due to snow, mud, gravel, etc. With open differentials, the wheel with least resistance starts to rotate faster than other wheels and thus can lead to vehicle getting stuck due to wheel spin. To avoid this, early prediction of differential lock of the set of differentials 30 is desirable, e.g., as in the action presented above.

Figure 5:
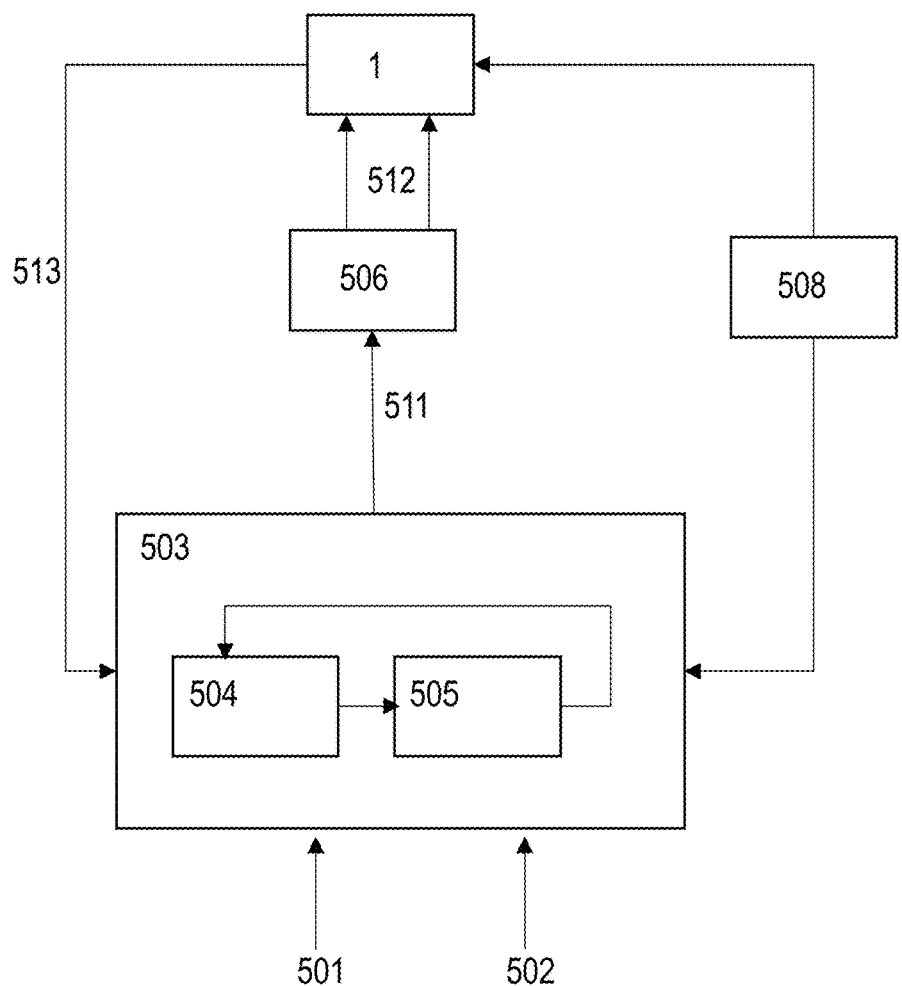
FIG. 5 illustrates an example prediction model according examples herein.

FIG. 5 illustrates an example prediction model according examples herein.

A prediction model 503 forming at least part of the prediction stage may comprise an iterated loop of a driver model 504 e.g., the predefined driver model, and a vehicle dynamics model 505 predicting longitudinal forces of the vehicle 1 based on different locking configurations of the set of differentials and based on the driver model 504 indicating acceleration requests.

The prediction model 503 may receive inputs of road type 501 of the path 100, e.g., and its approximate friction of the path 100, and road profile 502 of the path 100, e.g., curvature and slope information of the path 100, such as part of the path information discussed in action 201.

A reference velocity 508 may be transmitted to the vehicle 1 and the prediction model 1.

The vehicle 1 may feedback vehicle states and friction estimation 513, the friction estimation being of a current surface.

The prediction model may use any one or more out of the road type 501, the road profile 502, the reference velocity 508 and the vehicle states and friction estimation 513 to predict, e.g., based on any one or more action above, which locking configuration for the set of differentials 30 achieves at least a required longitudinal force to drive the vehicle 1 in the driving direction D. A preferred differential locking configuration for a predicted horizon, i.e., in the target area 50, may be indicated 511 to a decision model 506. The decision model 506 may determine whether or not the preferred differential locking configuration is possible to use in the target area 50, e.g., with respect to steering compensation and capabilities, and may further indicate 512 to the vehicle 1, which of the differentials to lock, inter-axle and/or inter-wheel differentials.

Some examples herein, including the scenario of FIG. 5 may relate to a long prediction horizon using road data, the long prediction horizon may comprise the target area 50. The road data, e.g., as part of the path information above, may be required as input to a driver model, e.g., the predefined driver model as discussed above, and may include attributes such as slope, curvature, and/or road surface type e.g., indicative of friction over the long horizon. Friction may be assumed to be constant for the prediction horizon or time varying, or as indicated by the path information. Such information may be obtained as described in the actions above, or may be received through a location-based pre-defined model e.g., Adasis, a camera, from recorded road information, and/or data from vehicles travelling ahead of the vehicle 1.

Additionally or alternatively, the following method, e.g., as performed by the processing circuitry 902, may be used to obtain slope information, curvature data and/or friction data.

Step 1: Camera or other sensors mounted on the vehicle 1, e.g., as part of the one or more sensors 20, may be used and/or controlled for measuring and/or determining any one or more out of road limits/boundaries, road surface type e.g., snow, mud, asphalt, etc. and/or approximate slope e.g., percent or angle.

Step 2: Driver history data of acceleration pedal rate and/or steering wheel rate possibly along with a current angular rate may be used to predict an approximate slope, percent and/or angle and curvature, e.g., indented curvature path of the path 100. In other words, Step 2 may comprises obtaining the driver history data, e.g., receiving from a server or based on local recordings of the driver input and/or vehicle 1 actions, and further, estimating the path information of the path 100 based on said driver history data.

The driver history data may be from the same driver or the same vehicle, but may also be associated with any driver or vehicle, e.g., travelling in the path 100.

Step 1 and/or Step 2 above may be part of action 201.

Further Variations and Examples

As mentioned above, examples herein may be defined into two stages, a prediction stage, e.g., as part of actions 201-207a/b above, and/or as part of the prediction model 503, and a decision stage, e.g., actions 208-212 above, and/or as part of the decision model 506.

The prediction stage may use a driver model, e.g., the predefined driver model, and a vehicle dynamics model, e.g., the vehicle dynamics model 505. The driver model may be any suitable speed controller and/or path follower that predicts longitudinal acceleration request, referred to as areq below, e.g., considering reference velocity, e.g., the reference vehicle motion, and current vehicle velocity, e.g., the vehicle motion information, and optionally using steering wheel angle request(s) along with road data information, e.g., as part of the path information of actions 201.

The vehicle dynamics model may include steps 11-16, e.g., which may iterate in a loop for a set prediction horizon, e.g., at least initially including the target area 50. Steps 11-16 may be combined with actions above and may be performed by the processing circuitry 902. Any of Steps 11-16 may be skipped if suitable.

Step 11. Obtaining a force required for propelling the vehicle 1 in the driving direction 1, e.g., as in action 205 above, such as by calculating:

Fx_req=mass×areq+rolling resistance force+slope resistance force, i.e., the required longitudinal force may be calculated based on the mass and an acceleration request, and accounted for a rolling resistance force, i.e., based on friction as part of the path information, and accounted for a slope resistance force, i.e., based on slope information as part of the path information.

Step 12. Comparing the required force of Step 11 with powertrain capabilities of the powertrain 15 of the vehicle 1 to determine whether or not the vehicle 1 can achieve the required force, if not, the vehicle 1 may need to be stopped or the driver may be alerted.

Step 13. Predicting vertical loads on each wheel/axle, based on a road profile and/or driver request such as based on the path information and/or the predefined driver model discussed above, e.g., as part of action 206.

Step 14. Calculating maximum actuator capabilities, i.e., the first longitudinal force and the one or more second longitudinal forces, e.g., as part of actions 207a and 207b. Example calculations for different locking configurations of the set of differentials 30 when the vehicle 1 is a 6×4 or a 8×4 vehicle:

All differentials open: $F_{xo\_diff} = 4 \times \min(\mu_{ij} \times F_{zij})$

Interaxle locked: $F_{xIAL\_diff} = 2 \times \min(\mu_{1j} \times F_{z1j}) + 2 \times \min(\mu_{2j} F_{z2j})$.

Interaxle and inter-wheel locked: $F_{xIWL\_diff} = \Sigma (\mu_{ij} \times F_{zij})$ where i may indicate a driven axle number, where j may indicate left/right wheel, where u may indicate predicted friction using road data, e.g., the path information, and wherein $F_z$ is the predicted vertical load.

Step 15. Predicting states of vehicle, e.g., any one or more out of longitudinal velocity, pitch velocity, and/pitch angle, and updating states for the vehicle dynamics model to be used for iterating the vehicles for further areas.

Step 16. Comparing the required force of Step 11 with actuator capabilities, and output a preferred control setting, e.g., as part of action 208. The preferred control setting may be a setting which is predicted to achieve at least the required force of Step 11.

Figure 6:
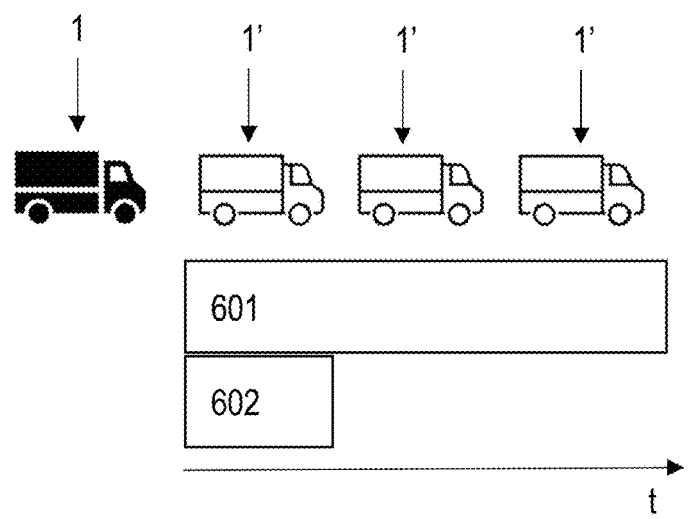
FIG. 6 illustrates an example scenario according examples herein.

FIG. 6 illustrates an example scenario according examples herein. FIG. 6 may illustrate part of the decision stage, e.g., as part of or combined with any one or more out of actions 208-212 above.

Based on the input from prediction stage, e.g., as in Steps 11-16 above, a controller such as the processing circuitry 902 may decide a suitable action immediately or at least before reaching areas where there are possibilities of wheel spin such as the target area 50. The actions may be to lock/unlock interaxle differentials and/or inter wheel differentials of the set of differentials, or alternatively using existing traction control function or using a vehicle's inertia (i.e., no action). The decision stage may further also includes a switching hysteresis to avoid fluctuations in output.

To summarize some of the examples herein, a simple vehicle model may predictively run ahead of the vehicle 1 using a prediction model, e.g., as in actions above, to cover a next time horizon and which outputs a preferred differential setting to maximize traction or at least to provide enough traction. The prediction stage may use current vehicle states, e.g., longitudinal velocity, pitch velocity, and/or pitch angle, obtained from the vehicle 1 to initialize the prediction model.

Examples herein are further applicable to trailers with independent propulsion systems.

Figure 7:
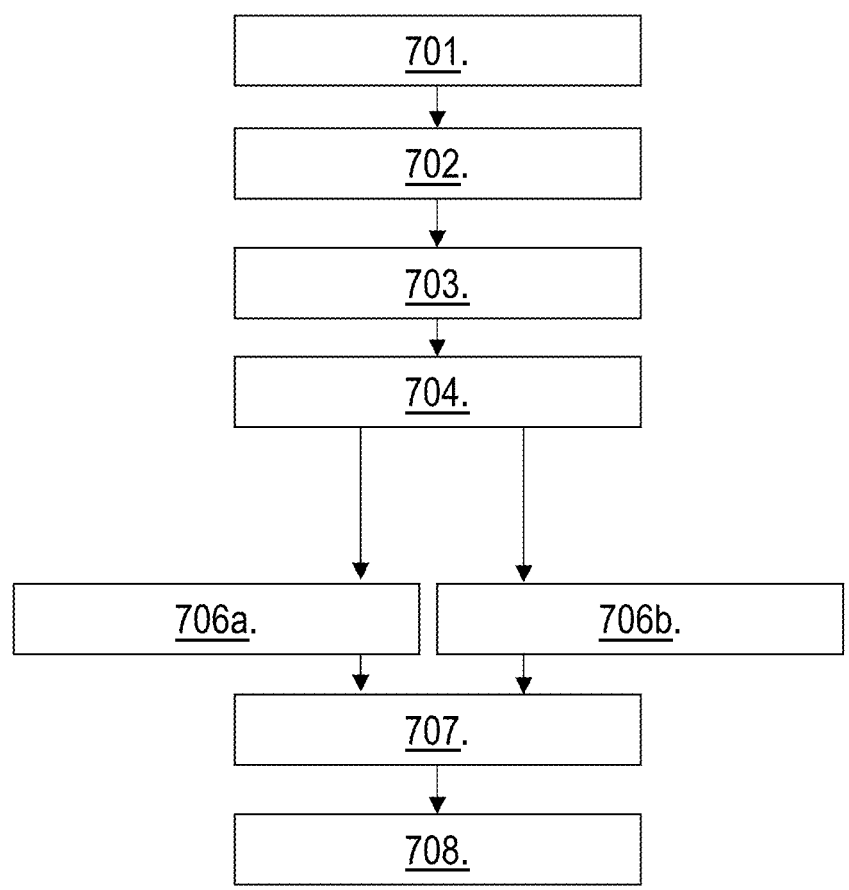
FIG. 7 is a flow chart of a method to according to an example.

FIG. 7 is a flow chart of a method to according to an example. The following actions may be combined with the above-mentioned actions or any other example(s) in any suitable manner.

A computer-implemented method for assisting in handling the set of differentials 30 of the vehicle 1 is provided.

Action 701

The method comprises, by the processing circuitry 902 of the computer system 900, obtaining path information of the path 100 travelled, or to be travelled, by the vehicle 1, the path information being indicative of a friction and/or a slope of the target area 50 in the driving direction D of the vehicle 1.

Action 702

The method comprises, by the processing circuitry 902, obtaining vehicle motion information of the vehicle 1, the vehicle motion information being indicative of a current vehicle speed of the vehicle 1.

Action 703

The method comprises, by the processing circuitry 902, obtaining a reference vehicle motion for the target area 50, the reference vehicle motion being indicative of a reference vehicle speed for the target area 50.

Action 704

The method comprises, by the processing circuitry 902, based on the vehicle motion information and the reference vehicle motion, predicting an acceleration request the vehicle 1 is to perform in the target area 50.

Action 705

The method comprises, by the processing circuitry 902, based on the vehicle motion information, the path information, and a mass of the vehicle 1, determining a required longitudinal force for driving the vehicle 1 in the driving direction D.

Actions 707a, 707b

The method comprises, by the processing circuitry 902, based on the acceleration request, the path information, and the mass of the vehicle 1, predicting a first longitudinal force of the vehicle 1 when the set of differentials 30 is configured according to a current configuration, and predicting one or more second longitudinal forces of the vehicle 1 using one or more differential locking configurations associated with locking or unlocking one or more differentials of the set of differentials 30.

Action 708

The method comprises, by the processing circuitry 902, when the first longitudinal force does not meet the required longitudinal force, selecting a differential locking configuration of the one or more differential locking configurations for the vehicle 1 to use, which selected differential locking configuration is associated with a second longitudinal force equal to, or greater than, the required longitudinal force.

Figure 8:
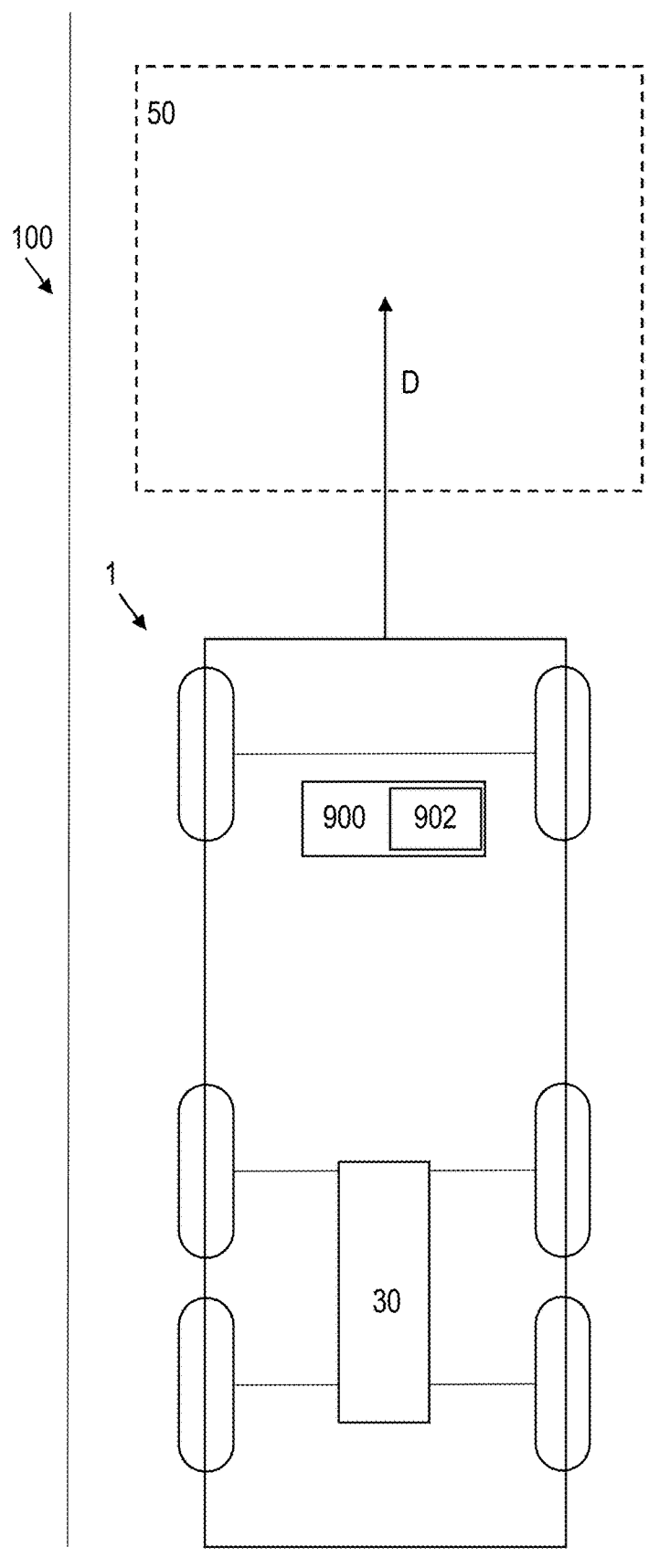
FIG. 8 is another view of FIG. 1, according to an example.

FIG. 8 is another view of FIG. 1, according to an example.

The computer system 900 comprising the processing circuitry 902 configured to assist in handling a set of differentials 30 of a vehicle 1 is provided.

The processing circuitry 902 is configured to obtain path information of the path 100 travelled, or to be travelled, by the vehicle 1. The path information is indicative of a friction and/or a slope of the target area 50 in the driving direction D of the vehicle 1.

The processing circuitry 902 is configured to obtain vehicle motion information of the vehicle 1. The vehicle motion information is indicative of a current vehicle speed of the vehicle 1.

The processing circuitry 902 is configured to obtain a reference vehicle motion for the target area 50. The reference vehicle motion is indicative of a reference vehicle speed for the target area 50.

The processing circuitry 902 is configured to, based on the vehicle motion information and the reference vehicle motion, predict an acceleration request the vehicle 1 is to perform in the target area 50.

The processing circuitry 902 is configured to, based on the vehicle motion information, the path information, and a mass of the vehicle 1, determine a required longitudinal force for driving the vehicle 1 in the driving direction D.

The processing circuitry 902 is configured to, based on the acceleration request, the path information, and the mass of the vehicle 1, predict a first longitudinal force of the vehicle 1 when the set of differentials 30 is configured according to a current configuration, and to predict one or more second longitudinal forces of the vehicle 1 using one or more differential locking configurations associated with locking or unlocking one or more differentials of the set of differentials 30.

The processing circuitry 902 is configured to, when the first longitudinal force is below the required longitudinal force, select a differential locking configuration of the one or more differential locking configurations for the vehicle 1 to use, which selected differential locking configuration is associated with a second longitudinal force equal to, or greater than, the required longitudinal force.

Figure 9:
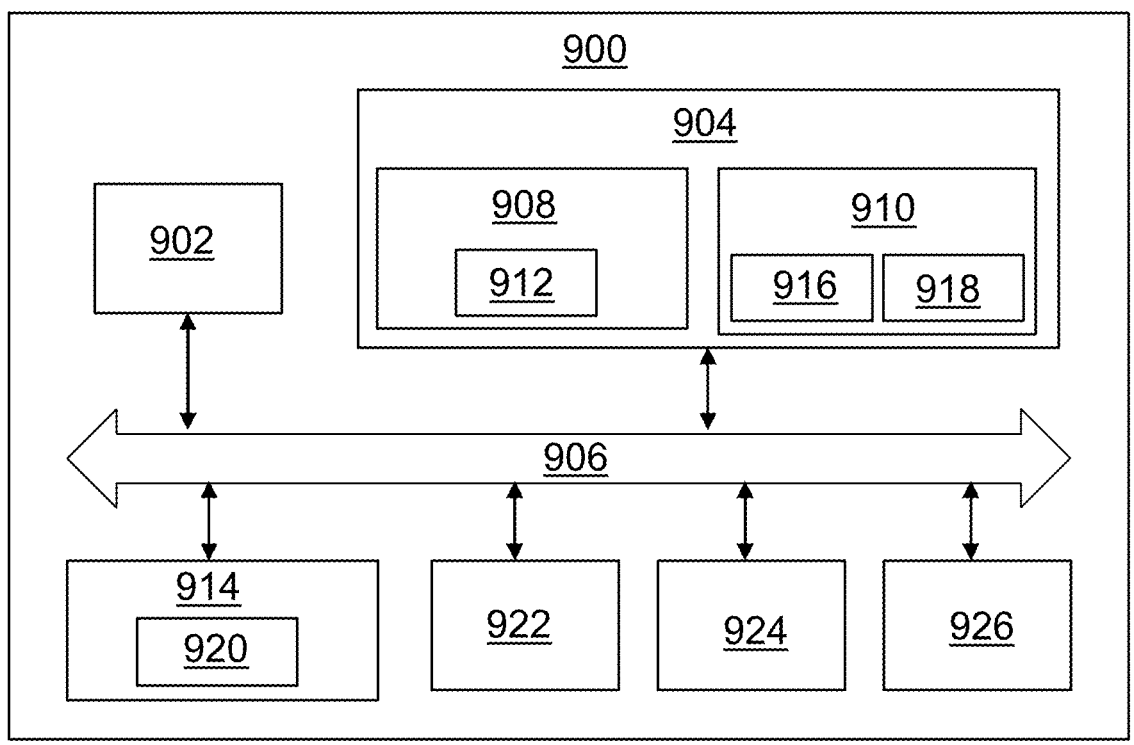
FIG. 9 is a schematic diagram of an exemplary computer system for implementing examples disclosed herein, according to an example.

FIG. 9 is a schematic diagram of the computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include the processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows a number of Examples which may be combined with the above examples in any suitable manner.

Example 1. A computer system 900 comprising processing circuitry 902 configured to assist in handling a set of differentials 30 of a vehicle 1, the processing circuitry 902 further being configured to:
  obtain path information of a path 100 travelled, or to be travelled, by the vehicle 1, the path information being indicative of a friction and/or a slope of a target area 50 in a driving direction D of the vehicle 1,
  obtain vehicle motion information of the vehicle 1, the vehicle motion information being indicative of a current vehicle speed of the vehicle 1,
obtain a reference vehicle motion for the target area 50, the reference vehicle motion being indicative of a reference vehicle speed for the target area 50,
  based on the vehicle motion information and the reference vehicle motion, predict an acceleration request the vehicle 1 is to perform in the target area 50,
  based on the vehicle motion information, the path information, and a mass of the vehicle 1, determine a required longitudinal force for driving the vehicle 1 in the driving direction D,
  based on the acceleration request, the path information, and the mass of the vehicle 1, predict a first longitudinal force of the vehicle 1 when the set of differentials 30 is configured according to a current configuration, and predict one or more second longitudinal forces of the vehicle 1 using one or more differential locking configurations associated with locking or unlocking one or more differentials of the set of differentials 30,
  when the first longitudinal force is below the required longitudinal force, select a differential locking configuration of the one or more differential locking configurations for the vehicle 1 to use, which selected differential locking configuration is associated with a second longitudinal force equal to, or greater than, the required longitudinal force.

Example 2. The computer system 900 of Example 1, wherein the processing circuitry 902 is configured to obtain at least part of the path information by sensing the path information using one or more sensors of the vehicle 1.

Example 3. The computer system 900 of Example 1 or 2, wherein the processing circuitry 902 is configured to obtain at least part of the path information by obtaining the path information from a storage medium and/or a server.

Example 4. The computer system 900 of any of Examples 1-3, wherein the path information is at least partly based on measurements of one or more measuring vehicles which have previously travelled the target area 50.

Example 5. The computer system 900 of any of Examples 1-4, wherein the processing circuitry 902 is configured to predict the acceleration request of the vehicle 1 in the target area 50, based on the path information, and based on a predefined driver model being indicative of timing and/or magnitude of the acceleration request.

Example 6. The computer system 900 of any of Examples 1-5, wherein any one or more out of: the required longitudinal force, the first longitudinal force, and/or the one or more second longitudinal forces, are limited based on force generating capabilities of a powertrain 40 of the vehicle 1.

Example 7. The computer system 900 of any of Examples 1-6, wherein the processing circuitry 902 is configured to:
based on the path information, predict one or more vertical loads applied to one or more axles and/or one or more wheels of the vehicle 1, and
predict the first longitudinal force and/or the one or more second longitudinal forces based on the predicted vertical loads.

Example 8. The computer system 900 of any of Examples 1-7, wherein the one or more differential locking configurations comprise locking an inter-wheel differential of the set of differentials 30, and/or wherein the one or more differential locking configurations comprise locking an inter-axle differential of the set of differentials 30.

Example 9. The computer system 900 of any of Examples 1-8, wherein the processing circuitry 902 is configured to apply the selected differential locking configuration prior to reaching the target area 50.

Example 10. The computer system 900 of any of Examples 1-9, wherein the processing circuitry 902 is configured to:
determine steering capabilities of the vehicle 1 when using the selected differential locking configuration in the target area 50, and
based on the path information and the steering capabilities, estimate a steering compensation required to maintain a vehicle 1 trajectory and/or to maintain the vehicle 1 within boundaries of the target area 50, and
determine whether or not to apply the selected differential locking configuration prior to reaching the target area 50 based on the estimated required steering compensation.

Example 11. A vehicle 1 comprising a set of differentials 30 and wherein the vehicle 1 comprises the computer system 900 of any of Examples 1-10.

Example 12. The vehicle 1 of Example 11, wherein the set of differentials 30 comprises at least one inter-wheel differential, or a combination of at least one inter-axle differential and at least two inter-wheel differentials Example 13. A computer-implemented method for assisting in handling a set of differentials 30 of a vehicle 1, comprising:

by processing circuitry 902 of a computer system 900, obtaining 201, 701 path information of a path 100 travelled, or to be travelled, by the vehicle 1, the path information being indicative of a friction and/or a slope of a target area 50 in a driving direction D of the vehicle 1, by the processing circuitry 902, obtaining 202, 702 vehicle motion information of the vehicle 1, the vehicle motion information being indicative of a current vehicle speed of the vehicle 1, by the processing circuitry 902, obtaining 203, 703 a reference vehicle motion for the target area 50, the reference vehicle motion being indicative of a reference vehicle speed for the target area 50, by the processing circuitry 902, based on the vehicle motion information and the reference vehicle motion, predicting 204, 704 an acceleration request the vehicle 1 is to perform in the target area 50, by the processing circuitry 902, based on the vehicle motion information, the path information, and a mass of the vehicle 1, determining 205, 705 a required longitudinal force for driving the vehicle 1 in the driving direction D, by the processing circuitry 902, based on the acceleration request, the path information, and the mass of the vehicle 1, predicting 207a, 707a a first longitudinal force of the vehicle 1 when the set of differentials 30 is configured according to a current configuration, and predicting 207b, 707b, one or more second longitudinal forces of the vehicle 1 using one or more differential locking configurations associated with locking or unlocking one or more differentials of the set of differentials 30, by the processing circuitry 902, when the first longitudinal force does not meet the required longitudinal force, selecting 208, 708 a differential locking configuration of the one or more differential locking configurations for the vehicle 1 to use, which selected differential locking configuration is associated with a second longitudinal force equal to, or greater than, the required longitudinal force.

Example 14. The method of Example 13, further comprising:

by the processing circuitry 902, based on the path information, predicting 206 one or more vertical loads applied to one or more axles and/or one or more wheels of the vehicle 1, and by the processing circuitry 902, predicting 207a, 207b the first longitudinal force and/or the one or more second longitudinal forces based on the predicted vertical loads.

Example 15. The method of any of Examples 13-14, further comprising:

by the processing circuitry 902, determining 209 steering capabilities of the vehicle 1 when using the selected differential locking configuration in the target area 50, and by the processing circuitry 902, based on the path information and the steering capabilities, estimating 210 a steering compensation required to maintain a vehicle 1 trajectory and/or to maintain the vehicle 1 within boundaries of the target area 50, and by the processing circuitry 902, determining 211 whether or not to apply the selected differential locking configuration prior to reaching the target area 50 based on the estimated required steering compensation.

Example 16. The method of any of Examples 13-15, further comprising:

by the processing circuitry 902, applying 212 the selected differential locking configuration prior to reaching the target area 50

Example 17. The method of any of Examples 13-16, wherein the one or more differential locking configurations comprise locking an inter-wheel differential of the set of differentials 30, and/or wherein the one or more differential locking configurations comprise locking an inter-axle differential of the set of differentials 30.

Example 18. The method of any of Examples 13-17, wherein the path information is at least partly based on measurements of one or more measuring vehicles which have previously travelled the target area 50.

Example 19. A computer program product comprising program code for performing, when executed by the processing circuitry 902, the method of any of Examples 13-18.

Example 20. A non-transitory computer-readable storage medium comprising instructions, which when executed by the processing circuitry 902, cause the processing circuitry 902 to perform the method of any of Examples 13-18

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to assist in handling a set of differentials of a vehicle, the processing circuitry further being configured to:
   obtain path information of a path travelled, or to be travelled, by the vehicle, the path information being indicative of a friction and/or a slope of a target area in a driving direction of the vehicle,
   obtain vehicle motion information of the vehicle, the vehicle motion information being indicative of a current vehicle speed of the vehicle,
obtain a reference vehicle motion for the target area, the reference vehicle motion being indicative of a reference vehicle speed for the target area,
   based on the vehicle motion information and the reference vehicle motion, predict an acceleration request the vehicle is to perform in the target area,
   based on the vehicle motion information, the path information, and a mass of the vehicle, determine a required longitudinal force for driving the vehicle in the driving direction,
   based on the acceleration request, the path information, and the mass of the vehicle, predict a first longitudinal force of the vehicle when the set of differentials is configured according to a current configuration, and predict one or more second longitudinal forces of the vehicle using one or more differential locking configurations associated with locking or unlocking one or more differentials of the set of differentials,
   when the first longitudinal force is below the required longitudinal force, select a differential locking configuration of the one or more differential locking configurations for the vehicle to use, which selected differential locking configuration is associated with a second longitudinal force equal to, or greater than, the required longitudinal force.

2. The computer system of claim 1, wherein the processing circuitry is configured to obtain at least part of the path information by sensing the path information using one or more sensors of the vehicle.

3. The computer system of claim 1, wherein the processing circuitry is configured to obtain at least part of the path information by obtaining the path information from a storage medium and/or a server.

4. The computer system of claim 1, wherein the path information is at least partly based on measurements of one or more measuring vehicles which have previously travelled the target area.

5. The computer system of claim 1, wherein the processing circuitry is configured to predict the acceleration request of the vehicle in the target area, based on the path information, and based on a predefined driver model being indicative of timing and/or magnitude of the acceleration request.

6. The computer system of claim 1, wherein any one or more out of: the required longitudinal force, the first longitudinal force, and/or the one or more second longitudinal forces, are limited based on force generating capabilities of a powertrain of the vehicle.

7. The computer system of claim 1, wherein the processing circuitry is configured to:
   based on the path information, predict one or more vertical loads applied to one or more axles and/or one or more wheels of the vehicle, and
   predict the first longitudinal force and/or the one or more second longitudinal forces based on the predicted vertical loads.

8. The computer system of claim 1, wherein the one or more differential locking configurations comprise locking an inter-wheel differential of the set of differentials, and/or wherein the one or more differential locking configurations comprise locking an inter-axle differential of the set of differentials.

9. The computer system of claim 1, wherein the processing circuitry is configured to apply the selected differential locking configuration prior to reaching the target area.

10. The computer system of claim 1, wherein the processing circuitry is configured to:
    determine steering capabilities of the vehicle when using the selected differential locking configuration in the target area, and
    based on the path information and the steering capabilities, estimate a steering compensation required to maintain a vehicle trajectory and/or to maintain the vehicle within boundaries of the target area, and
    determine whether or not to apply the selected differential locking configuration prior to reaching the target area based on the estimated required steering compensation.

11. A vehicle comprising a set of differentials and wherein the vehicle comprises the computer system of claim 1, and optionally, wherein the set of differentials comprise at least one inter-wheel differential, or a combination of at least one inter-axle differential and at least two inter-wheel differentials.

12. A computer-implemented method for assisting in handling a set of differentials of a vehicle, comprising:
    by processing circuitry of a computer system, obtaining path information of a path travelled, or to be travelled, by the vehicle, the path information being indicative of a friction and/or a slope of a target area in a driving direction of the vehicle,
    by the processing circuitry, obtaining vehicle motion information of the vehicle, the vehicle motion information being indicative of a current vehicle speed of the vehicle,
    by the processing circuitry, obtaining a reference vehicle motion for the target area, the reference vehicle motion being indicative of a reference vehicle speed for the target area, by the processing circuitry, based on the vehicle motion information and the reference vehicle motion, predicting an acceleration request the vehicle is to perform in the target area, by the processing circuitry, based on the vehicle motion information, the path information, and a mass of the vehicle, determining a required longitudinal force for driving the vehicle in the driving direction, by the processing circuitry, based on the acceleration request, the path information, and the mass of the vehicle, predicting a first longitudinal force of the vehicle when the set of differentials is configured according to a current configuration, and predicting one or more second longitudinal forces of the vehicle using one or more differential locking configurations associated with locking or unlocking one or more differentials of the set of differentials, by the processing circuitry, when the first longitudinal force does not meet the required longitudinal force, selecting a differential locking configuration of the one or more differential locking configurations for the vehicle to use, which selected differential locking configuration is associated with a second longitudinal force equal to, or greater than, the required longitudinal force.

13. The method of claim 12, further comprising:

by the processing circuitry, based on the path information, predicting one or more vertical loads applied to one or more axles and/or one or more wheels of the vehicle, and by the processing circuitry, predicting the first longitudinal force and/or the one or more second longitudinal forces based on the predicted vertical loads, and optionally, by the processing circuitry, determining steering capabilities of the vehicle when using the selected differential locking configuration in the target area, and optionally, by the processing circuitry, based on the path information and the steering capabilities, estimating a steering compensation required to maintain a vehicle trajectory and/or to maintain the vehicle within boundaries of the target area, and optionally, by the processing circuitry, determining whether or not to apply the selected differential locking configuration prior to reaching the target area based on the estimated required steering compensation, optionally, by the processing circuitry, applying the selected differential locking configuration prior to reaching the target area, optionally wherein the one or more differential locking configurations comprise locking an inter-wheel differential of the set of differentials, and/or wherein the one or more differential locking configurations comprise locking an inter-axle differential of the set of differentials, and optionally, wherein the path information is at least partly based on measurements of one or more measuring vehicles which have previously travelled the target area.

14. A computer program product comprising program code for performing, when executed by the processing circuitry, the method of claim 12.

15. A non-transitory computer-readable storage medium comprising instructions, which when executed by the processing circuitry, cause the processing circuitry to perform the method of claim 12.

* * * * *